US012214473B2

(12) United States Patent
Beguin et al.

(10) Patent No.: US 12,214,473 B2
(45) Date of Patent: Feb. 4, 2025

(54) IMPACT SCREWING/UNSCREWING DEVICE WITH IDLING CONTROL

(71) Applicant: ETABLISSEMENTS GEORGES RENAULT, Saint Herblain (FR)

(72) Inventors: Rémi Beguin, Nantes (FR); Pierre Guilbaud, Nantes (FR); Benjamin Barbaud, Saint Herblain (FR)

(73) Assignee: ETABLISSEMENTS GEORGES RENAULT, Saint Herblain (FR)

( * ) Notice: Subject to any disclaimer, the term of this patent is extended or adjusted under 35 U.S.C. 154(b) by 1 day.

(21) Appl. No.: 18/259,167

(22) PCT Filed: Dec. 23, 2021

(86) PCT No.: PCT/EP2021/087549
§ 371 (c)(1),
(2) Date: Jun. 23, 2023

(87) PCT Pub. No.: WO2022/136662
PCT Pub. Date: Jun. 30, 2022

(65) Prior Publication Data

US 2024/0051100 A1 Feb. 15, 2024

(30) Foreign Application Priority Data

Dec. 24, 2020 (FR) ....................................... 2014124

(51) Int. Cl.
*B25B 23/147* (2006.01)
*B25B 21/02* (2006.01)

(52) U.S. Cl.
CPC ........ *B25B 23/1475* (2013.01); *B25B 21/026* (2013.01)

(58) Field of Classification Search
None
See application file for complete search history.

(56) References Cited

U.S. PATENT DOCUMENTS 6,868,742 B2 * 3/2005 Schoeps .............. B25B 23/1405 73/862.21
10,562,160 B2 * 2/2020 Iwata ...................... B25B 21/02
(Continued)

FOREIGN PATENT DOCUMENTS

EP 3098027 A1 11/2016
EP 3653339 A1 5/2020
SE 519292 C2 * 2/2003 ......... B25B 23/1405

OTHER PUBLICATIONS

English translation of the Written Opinion of the International Searching Authority dated Apr. 7, 2022 for corresponding International Application No. PCT/EP2021/087549, filed Dec. 23, 2021.
(Continued)

*Primary Examiner* — Tanzim Imam
(74) *Attorney, Agent, or Firm* — David D. Brush; Westman, Champlin & Koehler, P.A.

(57) ABSTRACT

An impact screwing/unscrewing device includes: an electric motor having a rotor; a controller for controlling the motor, which can transmit an instruction to the motor; and an impact mechanism. The impact mechanism includes: at least one anvil mounted to rotate about the axis of rotation of the rotor; at least one hammer capable of being rotated by the motor about the axis, the hammer being movable between at least: a non-engaged position in which it is not capable of colliding with the at least one anvil when the hammer is rotated by the motor, and an engaged position in which it is capable of colliding with the at least one anvil when the hammer is rotated by the motor. A variation of the instruction supplied to the motor by the controller triggers passage of the at least one hammer from one of the positions thereof to the other.

21 Claims, 12 Drawing Sheets

(56) References Cited

U.S. PATENT DOCUMENTS

| | | | | |
|---|---|---|---|---|
| 2019/0344411 | A1* | 11/2019 | Leh ......................... | B25B 21/02 |
| 2020/0112283 | A1 | 4/2020 | Mahot | |

OTHER PUBLICATIONS

International Search Report dated Apr. 7, 2022 for corresponding International Application No. PCT/EP2021/087549, filed Dec. 23, 2021.
Written Opinion of the International Searching Authority dated Apr. 7, 2022 for corresponding International Application No. PCT/EP2021/087549, filed Dec. 23, 2021.

* cited by examiner

[Fig. 1]
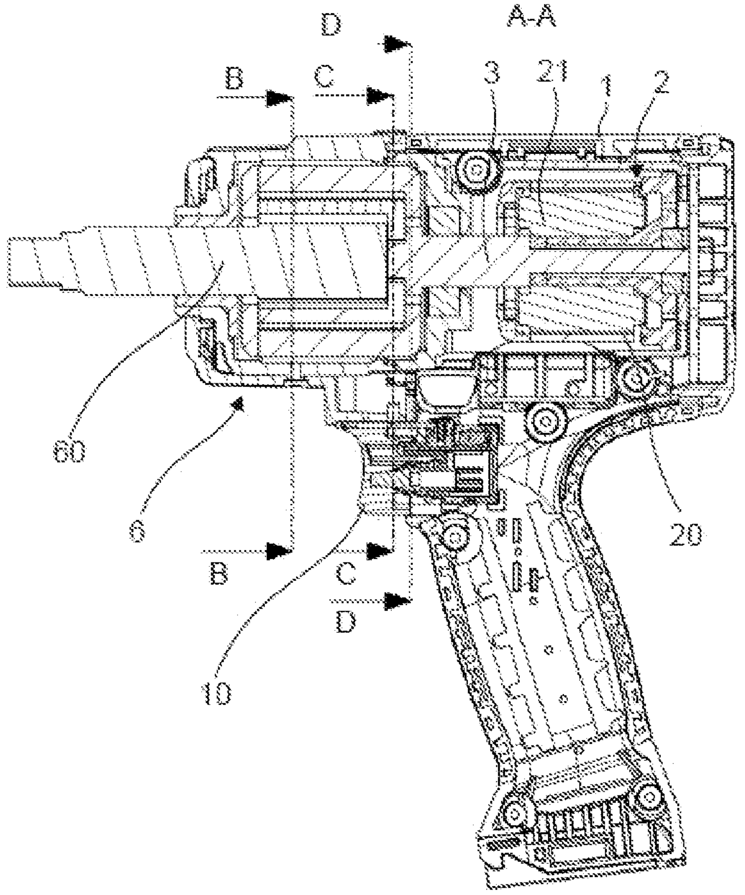

[Fig. 2]
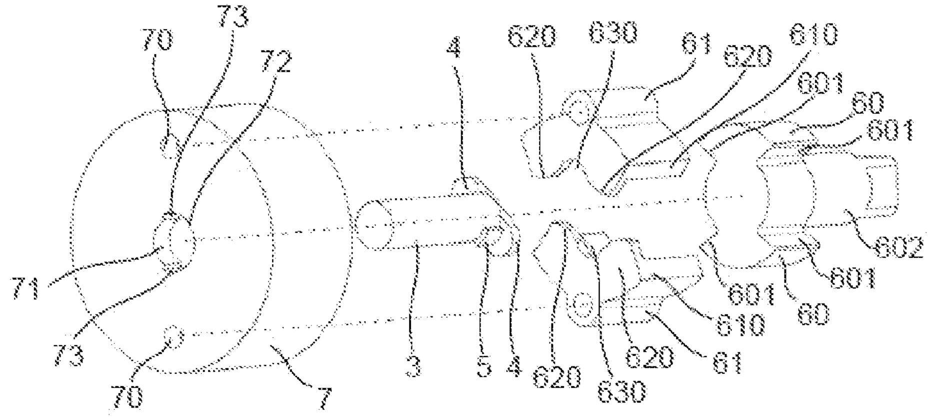
[Fig. 3]
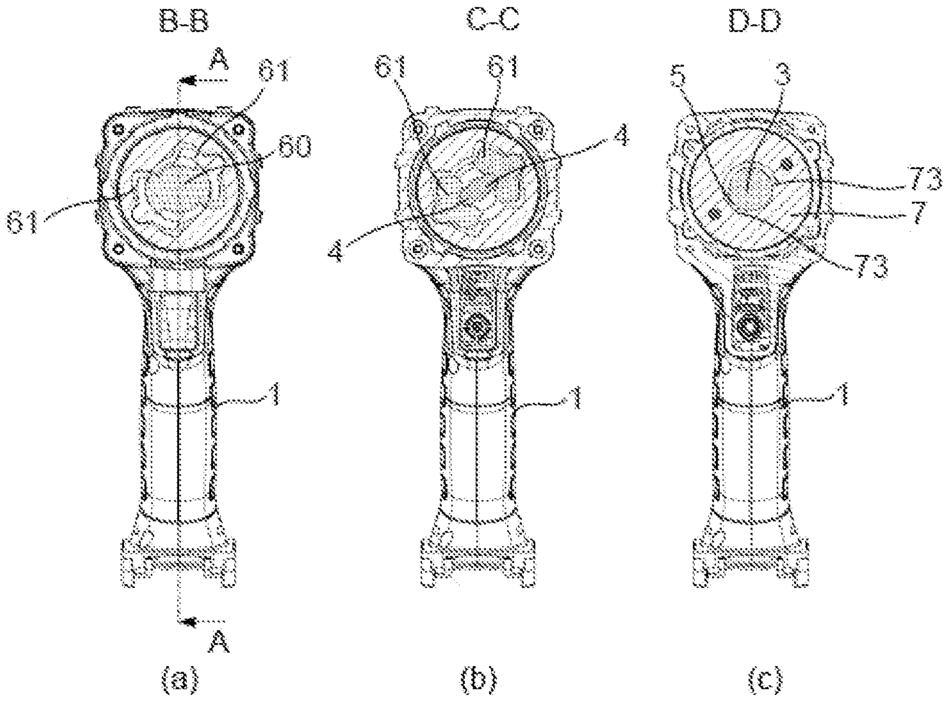

[Fig. 4]
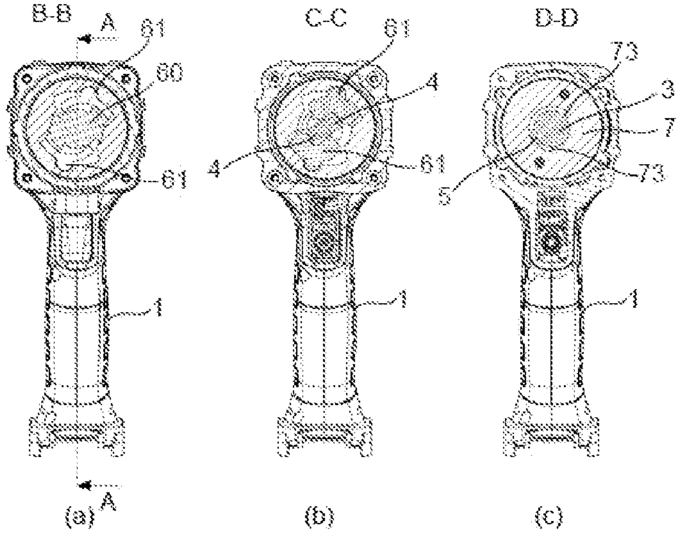
[Fig. 5]
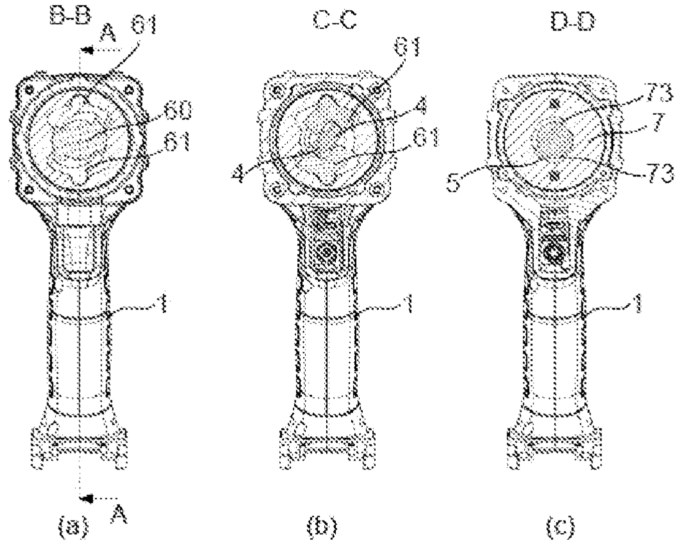
[Fig. 6]
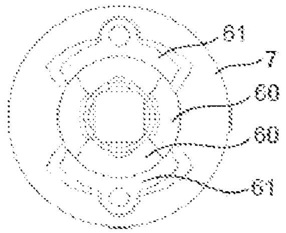

[Fig. 7]
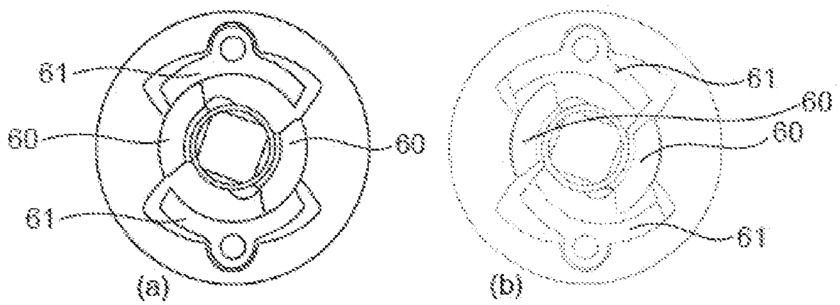
[Fig. 8]
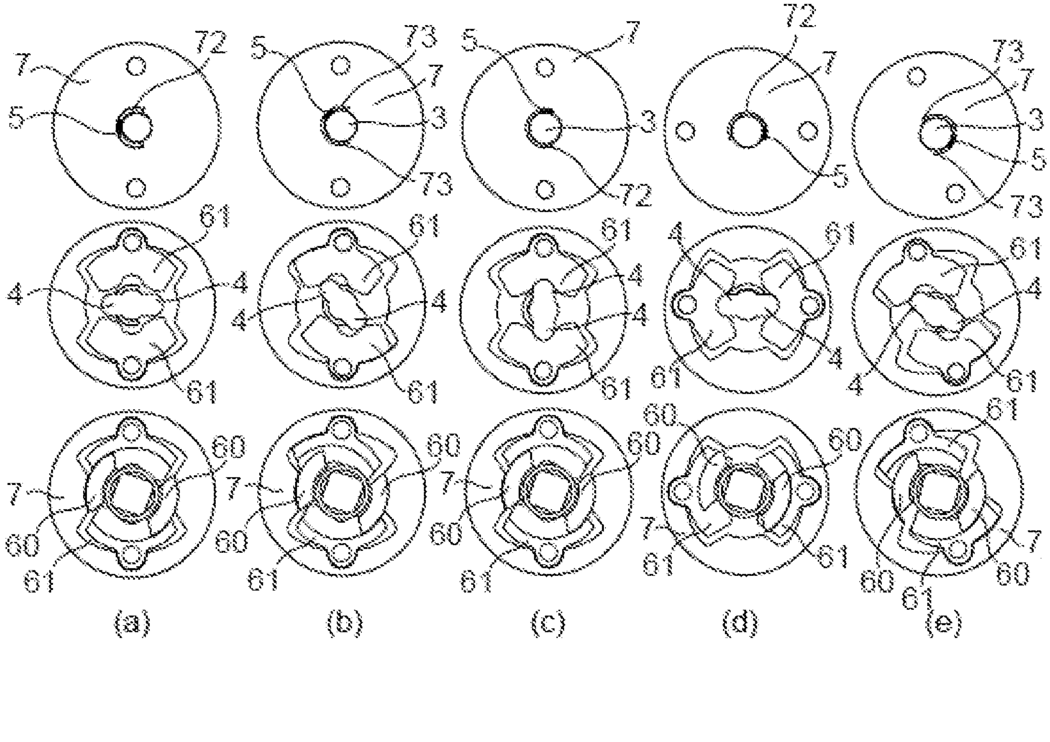

[Fig. 9]
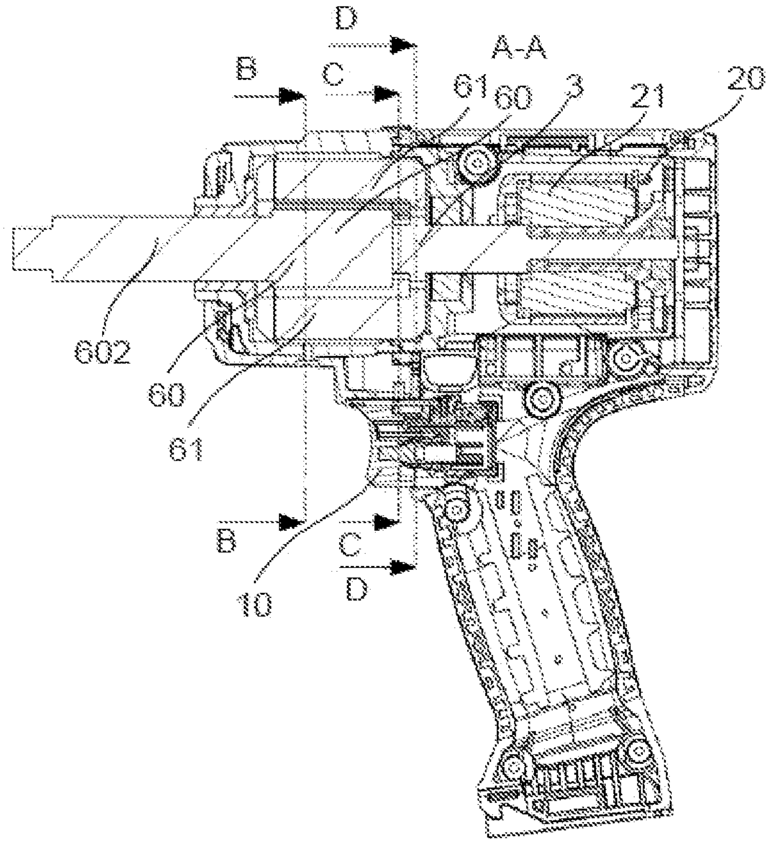
[Fig. 10]
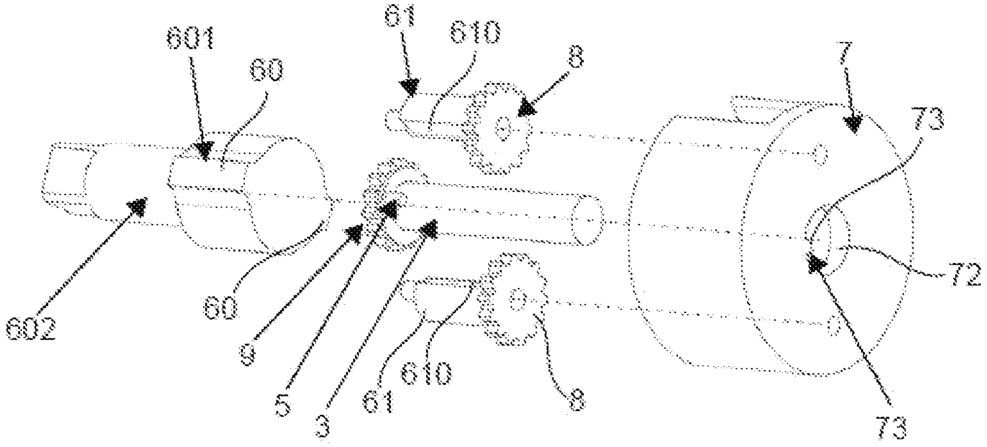

[Fig. 11]
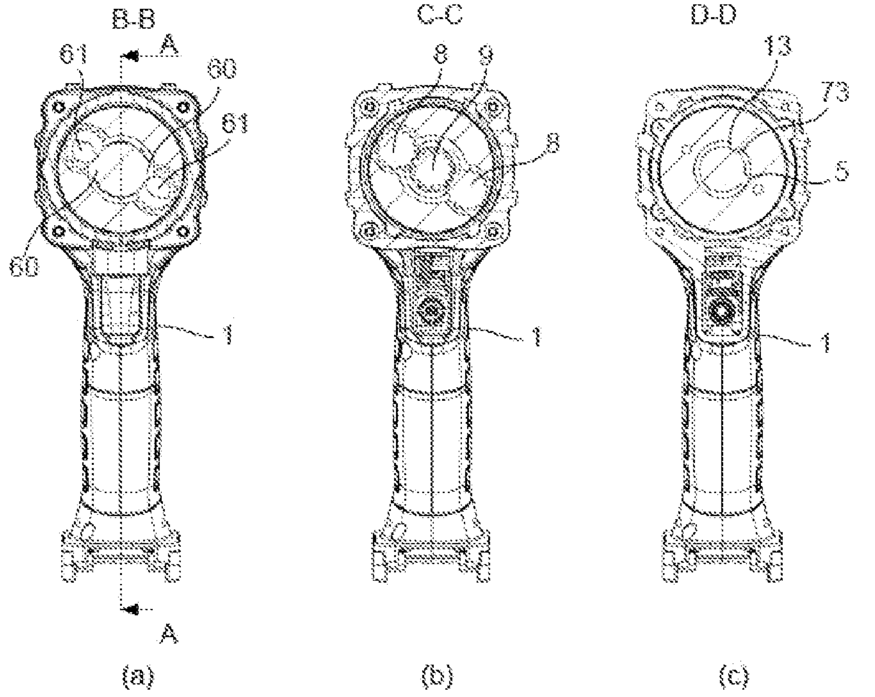
[Fig. 12]
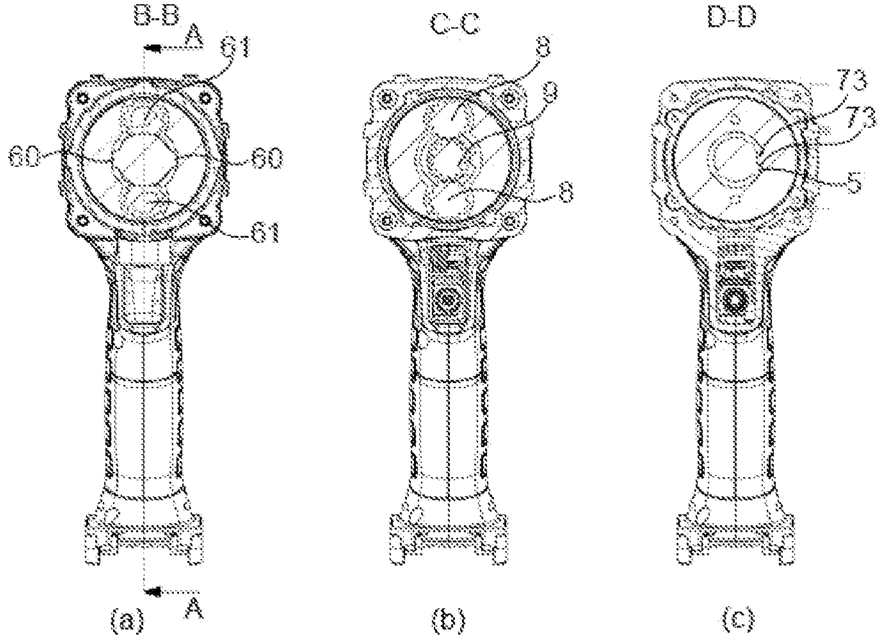

[Fig. 13]
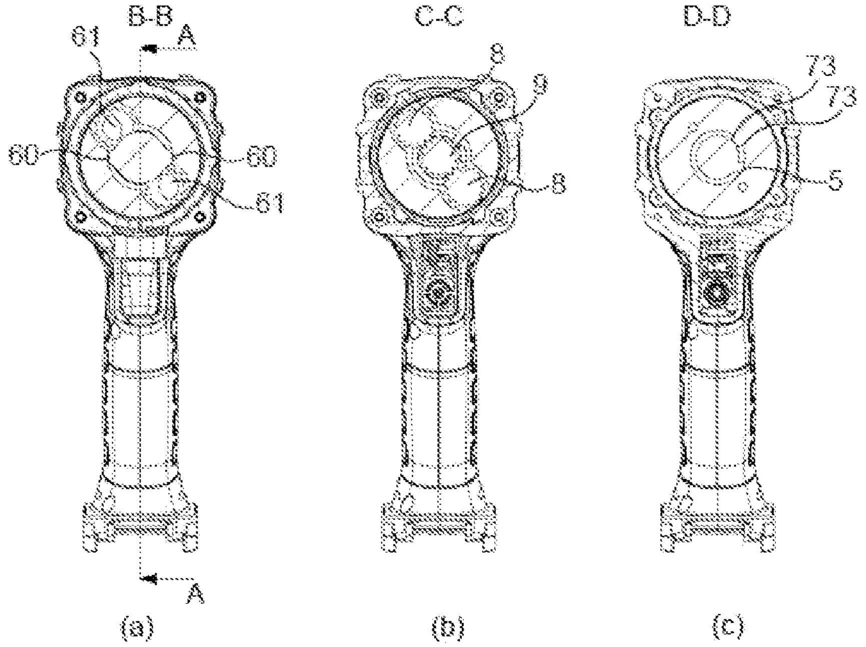
[Fig. 14]
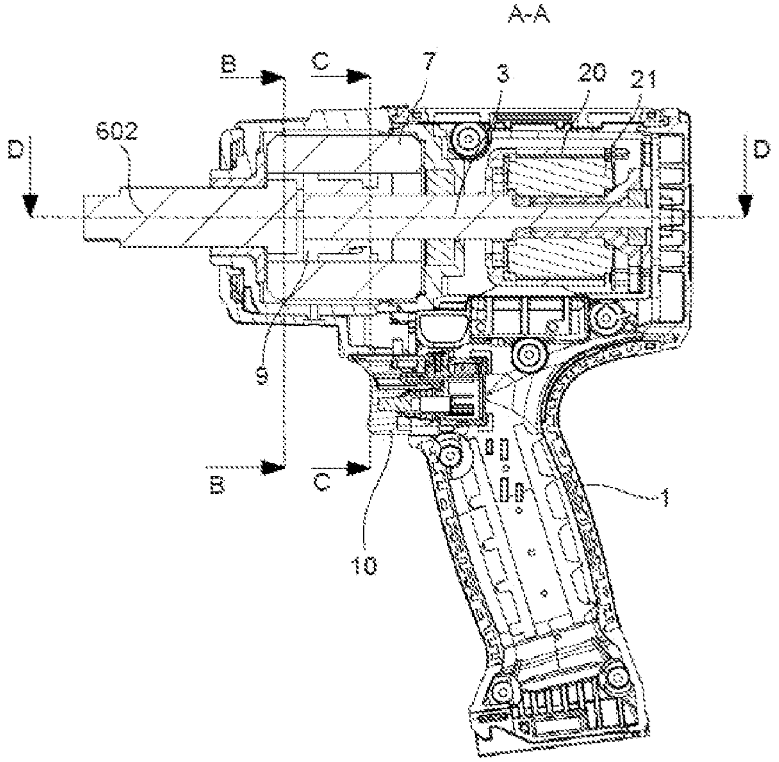

[Fig. 15]
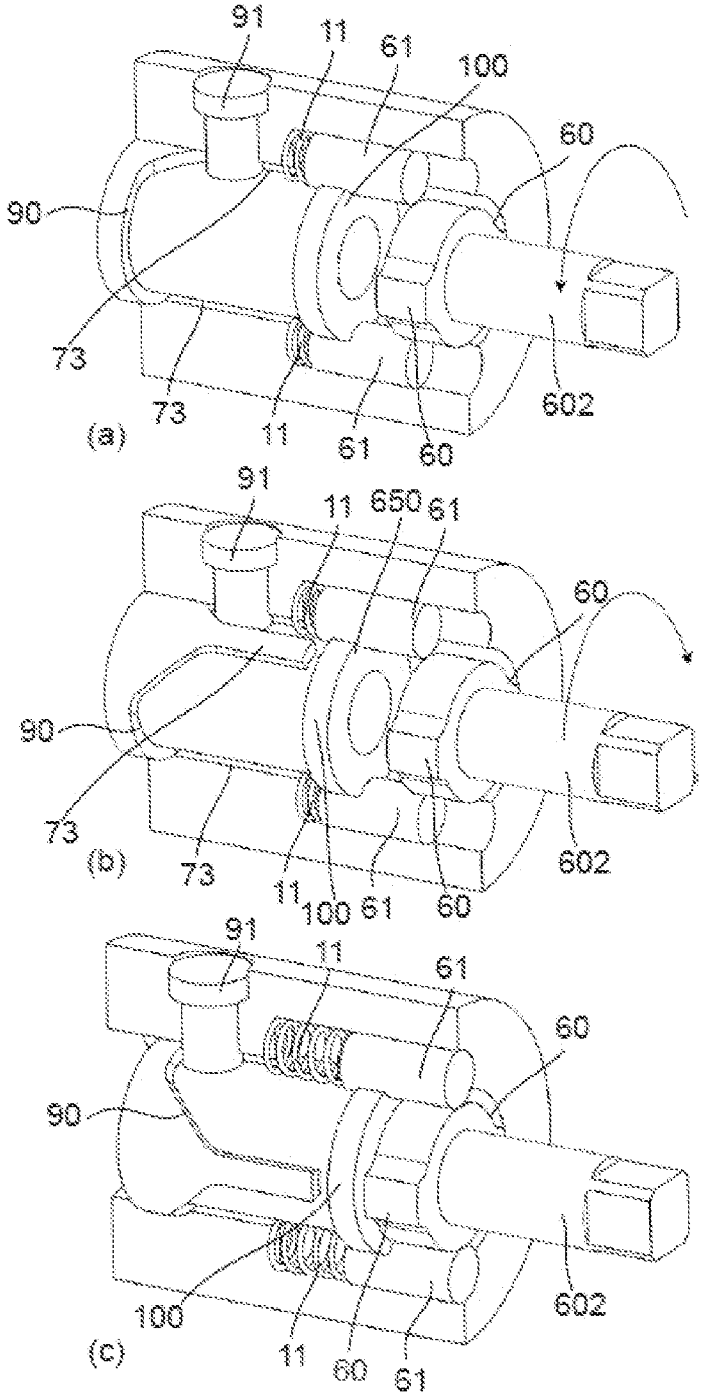

[Fig. 16]
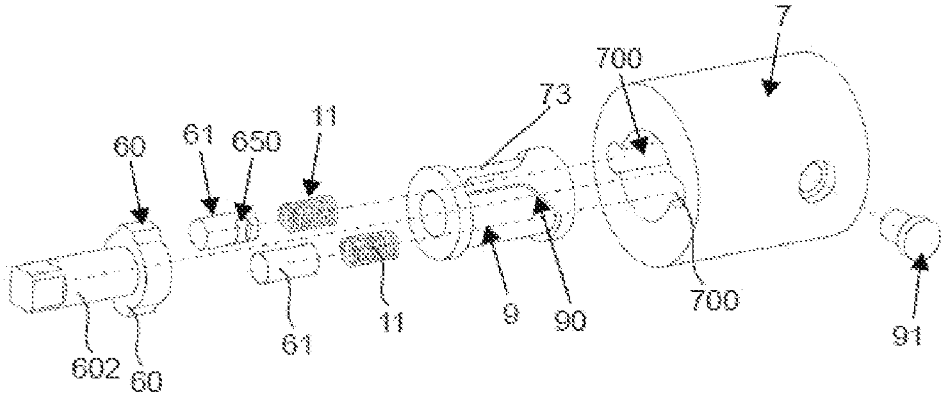
[Fig. 17]
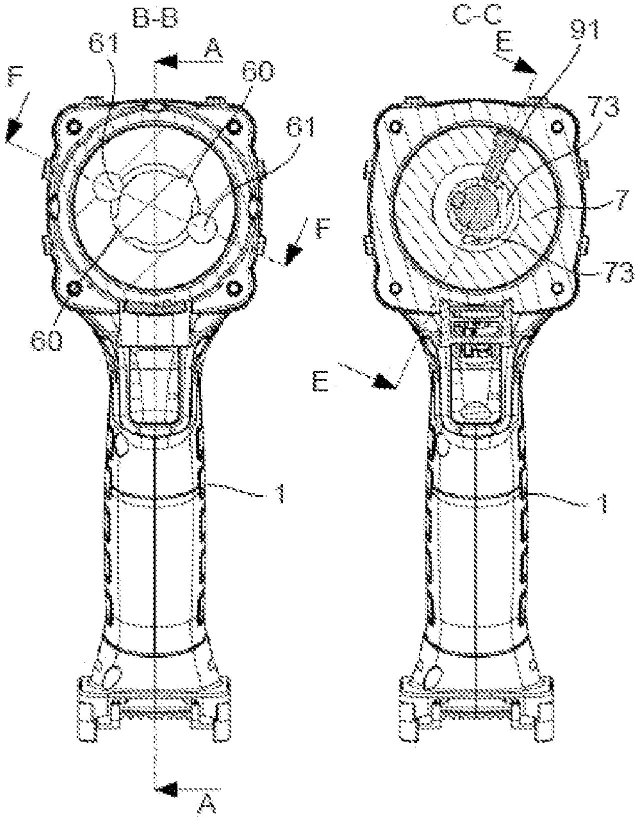
(a) (b)

[Fig. 18]
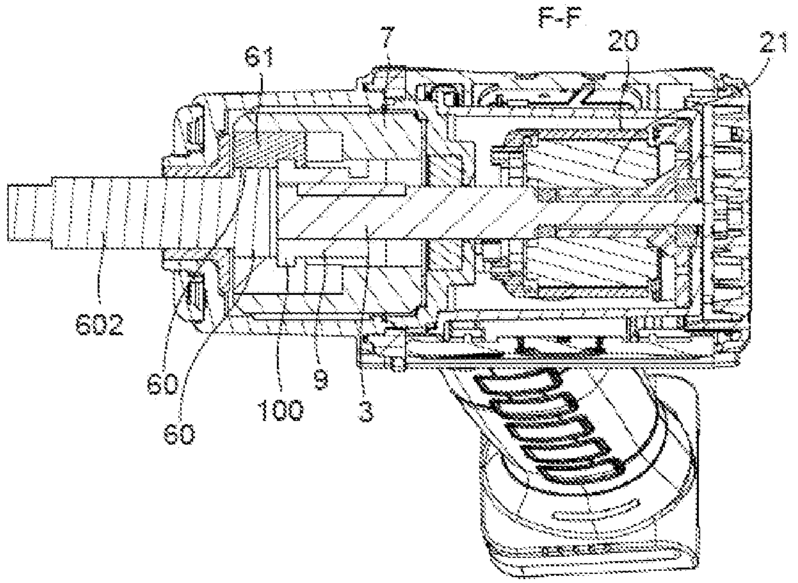
[Fig. 19]
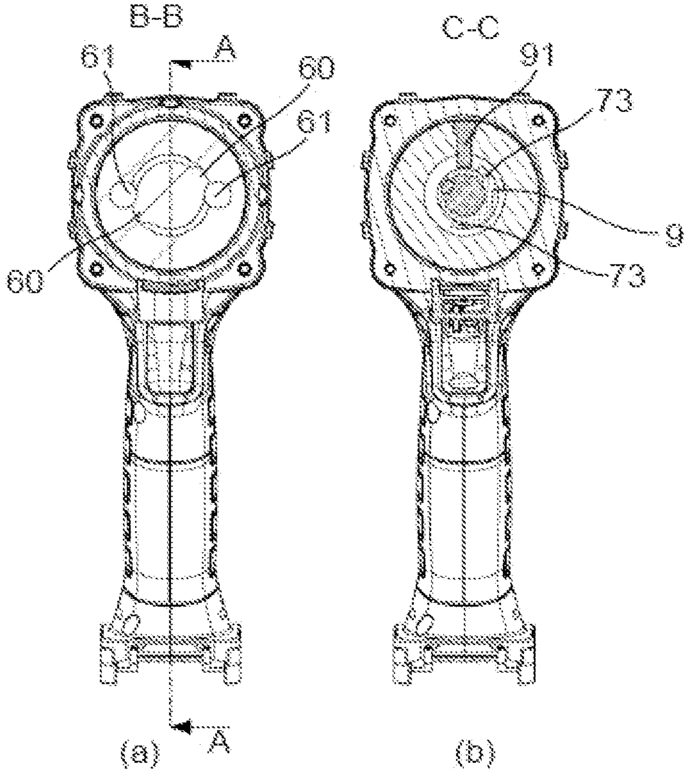

[Fig. 20]
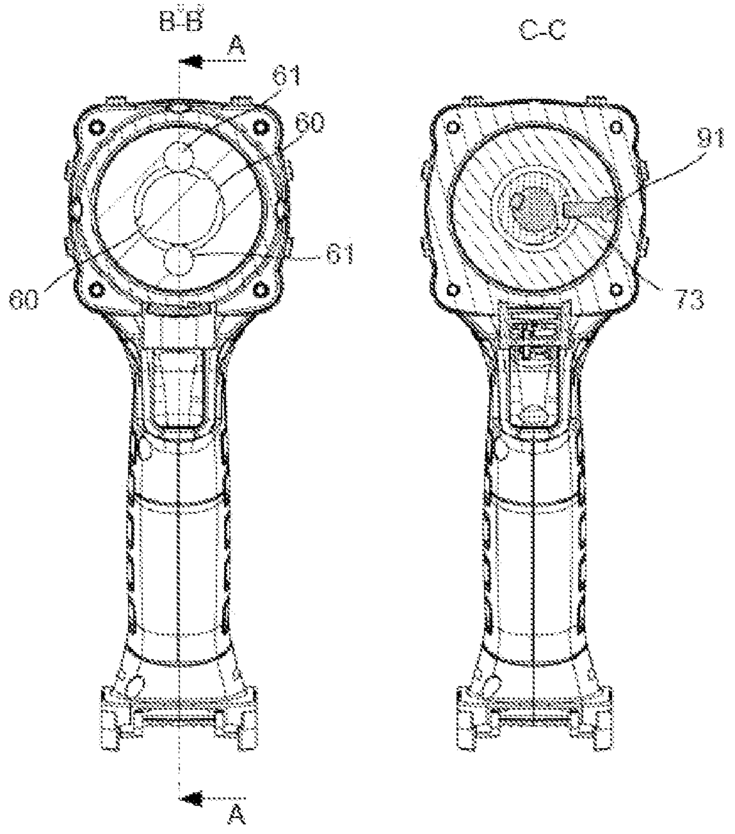
[Fig. 21]
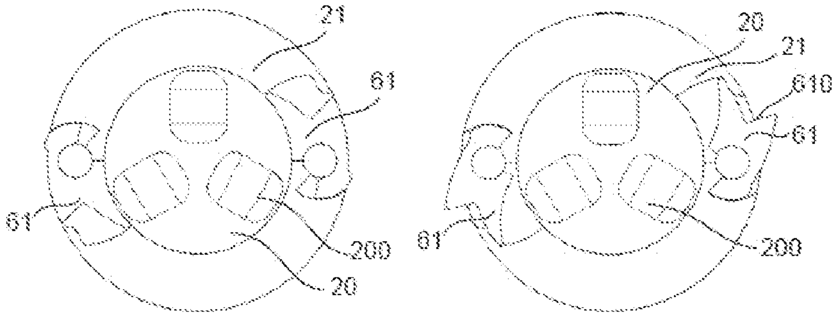
(a) (b)

[Fig. 22]
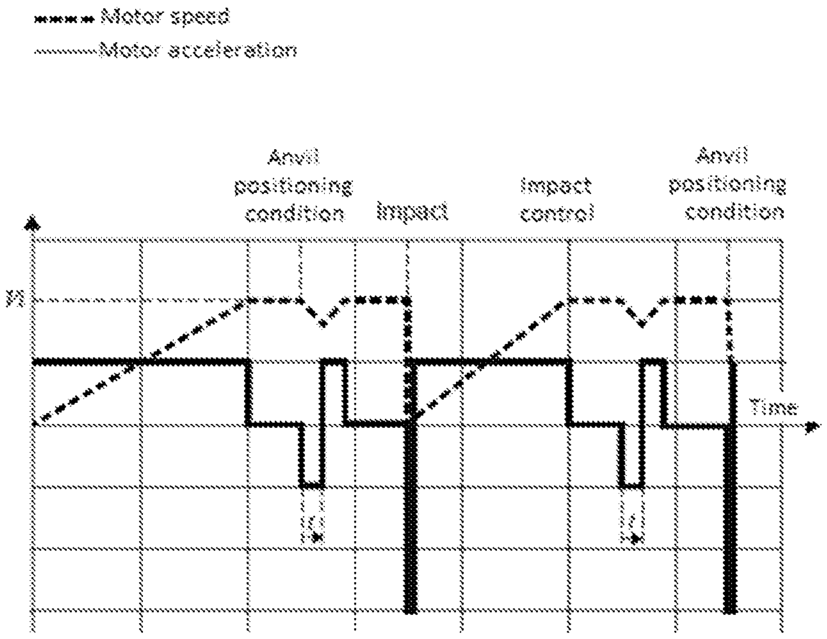

IMPACT SCREWING/UNSCREWING DEVICE WITH IDLING CONTROL

1. CROSS-REFERENCE TO RELATED APPLICATIONS

This application is a Section 371 National Stage Application of International Application No. PCT/EP2021/087549, filed Dec. 23, 2021, which is incorporated by reference in its entirety and published as WO 2022/136662 A1 on Jun. 30, 2022, not in English.

2. FIELD OF THE INVENTION

The field of the invention is that of the design and manufacture of impact screwing/unscrewing devices, more commonly known as impact wrenches.

3. PRIOR ART

An impact wrench is a tool conventionally used to tighten and loosen elements such as nuts or screws, without causing torque feedback to the hand of the operator using them.

Such a tool comprises an electric or pneumatic motor and an impact mechanism, the input whereof is connected to the rotor of the motor and the output whereof comprises an output square capable of rotating a screwing tool. The impact mechanism typically comprises a flywheel which can be rotated by the motor and which carries a mass, more typically referred to as a hammer, which is capable of striking the output square, which acts as an anvil, and thus rotate it to transmit a torque to the element to be tightened-loosened. The striking mechanism thus transforms the kinetic energy of a rotating mass (driven by the motor) into impact energy. There are several types of impact mechanism but they all have the common feature of having one or more hammers that strike the output square.

Different types of impact mechanisms exist, such as Twin hammer, Two jaws or Pin clutch mechanisms, etc. which all have the common feature of systematically generating a determined number of impacts per revolution, which number is generally equal to one, sometimes two. The number of impacts per revolution is linked to the kinematics of the impact mechanism and cannot be changed.

All impact mechanisms operate on the same principle, i.e. a multitude of impacts are required to gradually reach the tightening torque. The tightening torque of an impact wrench is thus dependent on the number of impacts and the amount of energy transmitted to the anvil during each impact. It is generally claimed that the tightening torque of an impact wrench corresponds to the torque reached after 10 seconds of screwing.

To reach a high tightening torque quickly, the energy transmitted to the output square during each impact must be high. This can be achieved by increasing the rotational speed of the impact mechanism before impact. This requires implementing a more powerful motor, which is a drawback, in particular in terms of overall dimensions, weight and cost.

Another solution involves running the impact wrench idle, i.e. by keeping the hammers in a non-engaged position where they cannot collide with the anvil, until the motor reaches a predetermined speed, and then placing the hammers in an engaged position wherein they are capable of colliding with the anvil to generate a high-power impact.

This technique is of interest, but requires implementing an actuator independent of the motor, in order to move the hammers from one of either the engaged or non-engaged position to the other. This type of impact wrench is thus structurally complex.

Impact wrenches can thus be further improved to enable them to quickly reach a high tightening torque.

4. SUMMARY

An exemplary embodiment of the invention proposes an impact screwing/unscrewing device comprising:

- an electric motor comprising a rotor;
- means for controlling said motor, which means are capable of transmitting a command instruction to said motor;
- an impact mechanism comprising:
  - at least one anvil mounted such that it can rotate about the axis of rotation of said rotor;
  - at least one hammer capable of being rotated by said motor about said axis, said at least one hammer being capable of moving between at least:
    - a non-engaged position in which it is not capable of colliding with said at least one anvil when the hammer is rotated by said motor, and
    - an engaged position in which it is capable of colliding with said at least one anvil when the hammer is rotated by said motor.

According to the invention, a variation of said command instruction supplied to said motor by said means for controlling triggers the passage of said at least one hammer from one of the positions thereof to the other.

Thus, according to this aspect of the invention, a simple variation of the instruction supplied to the motor allows the hammers to be moved from one of their positions to the other without the need to implement an actuator to allow this movement to take place. This makes the device according to the invention very simple in design, but nonetheless allows high tightening torques to be reached quickly by making it possible to activate the striking mechanism when the motor is running fast enough.

According to one possible feature, said device comprises a flywheel coaxial to said rotor.

According to one possible feature, said means for controlling of said motor allow said device to be implemented in order to carry out a screwing or unscrewing operation comprising carrying out a series of successive impact cycles during each of which the hammers collide with the anvils, said means for controlling being capable of transmitting a command instruction to said motor, said means for controlling being capable of generating, during each impact cycle, a variation of said command instruction supplied to said motor by said means for controlling, said variation triggering the passage of said at least one hammer from one of its positions to the other.

According to one possible feature:

- said at least one hammer comprises at least one striking surface and said at least one anvil comprises at least one collision surface,
- said striking and collision surfaces being capable of hitting one another when said at least one hammer is in said engaged position and when said at least one hammer is rotated by said motor,
- said striking and collision surfaces not being capable of hitting one another when said at least one hammer is in said non-engaged position and when said at least one hammer is rotated by said motor.

According to one possible feature:

- said rotor is provided with a drive shaft, said flywheel is coaxial with said drive shaft, said at least one hammer being attached to said flywheel such that it can move between the non-engaged and engaged positions thereof, said flywheel being capable of rotating relative to said drive shaft over an angular range bounded by at least one end position wherein said flywheel and said drive shaft are rotatably linked and said at least one hammer is in the non-engaged position thereof, said device comprising at least one actuating element acting on said at least one hammer in order to place it in the non-engaged position thereof when said drive shaft is in said at least one end position and in the engaged position thereof when said drive shaft is in a predetermined position in said angular range.

According to one possible feature, said angular range is bounded by two end positions of said drive shaft relative to said flywheel in which said flywheel and said drive shaft are rotatably linked and said at least one hammer is in the non-engaged position thereof.

According to one possible feature, said at least one hammer is capable of rotating, between the engaged and non-engaged positions thereof, along an axis parallel to the axis of rotation of said motor.

According to one possible feature, a device according to the invention comprises an indexing pin fixed to said drive shaft for rotation therewith and capable of bearing, in said at least one end position, against at least one stop, that is fixed to said flywheel for rotation therewith, so as to rotatably link said drive shaft and said flywheel.

According to one possible feature:

said at least one actuating element comprises at least one fin that is fixed to said drive shaft for rotation therewith and capable of moving along at least one ramp rigidly connected to said at least one hammer, said at least one fin and said at least one ramp being shaped so as to place said at least one hammer in said non-engaged position when said drive shaft is in said at least one end position and so as to place said at least one hammer in said engaged position when said drive shaft is in said predetermined position in said angular range.

According to one possible feature:

said device comprises at least one driven gear fixed to each of said hammers for rotation therewith, which hammers are rigidly connected to said flywheel, said at least one actuating element comprising a drive gear fixed to said drive shaft for rotation therewith and engaged with the one or more of said driven gears, a relative motion of said drive shaft to said flywheel allowing said at least one hammer to be moved between the engaged and non-engaged positions thereof.

According to one possible feature, said at least one hammer is capable of translating, between the engaged and non-engaged positions thereof, along an axis parallel to the axis of rotation of said drive shaft.

According to one possible feature, a device according to the invention comprises a secondary drive shaft fixed to said drive shaft for rotation therewith but free to translate, said secondary drive shaft being mounted such that it can translate and rotate relative to said flywheel along the axis of rotation of said drive shaft, said secondary drive shaft comprising at least one cam against which at least one guide pin rigidly connected to said flywheel is capable of moving, said at least one cam having a profile that is shaped to allow said secondary drive shaft to rotate relative to said flywheel over said angular range between said at least one end position and said predetermined position, and to allow for a translational movement of said secondary drive shaft relative to said flywheel during the movement thereof between said at least one end position and said predetermined position.

According to one possible feature, said at least one hammer is fixed to said drive shaft for translation therewith but not for rotation therewith, and is mounted such that it can translate relative to said flywheel so as to be moved between the engaged and non-engaged positions thereof by said drive shaft.

According to one possible feature, said motor comprises an internal stator provided with coils, said rotor being external, said at least one hammer being fixed to said rotor for rotation therewith and being mounted such that it can rotate relative to said rotor between the engaged and non-engaged positions thereof along an axis parallel to the axis of rotation of said rotor, the magnetic fields created by said coils acting on said at least one hammer:

to place it in the non-engaged position thereof when said means for controlling power said coils in order to rotate said rotor, to place it in the engaged position thereof when said means for controlling do not power said coils in order to rotate said rotor.

According to one possible feature, said means for controlling are capable of:

supplying an instruction to accelerate said motor in one direction to place said drive shaft in one of the end positions thereof and rotate said flywheel in one direction up to a predetermined speed;

supplying a deceleration instruction to said motor such that said drive shaft moves relative to said flywheel over said angular range to reach said predetermined position and place said at least one hammer in the engaged position thereof to cause said at least one hammer to collide with said at least one anvil, supplying an instruction to re-accelerate said motor in said direction.

According to one possible feature, said means for controlling are configured to:

supply an instruction to power said motor in order to rotate said rotor and place said at least one hammer in said non-engaged position;

supply an instruction to not power said motor in order to place said at least one hammer in said non-engaged position and allow said rotor to rotate in said direction to cause said at least one hammer to collide with said at least one anvil.

According to one possible feature, said means for controlling are configured to maintain the rotation of said rotor at said predetermined speed until they detect at least one parameter signifying that said at least one hammer is in a predetermined angular position along the axis of rotation of said rotor relative to said at least one anvil before supplying said instruction to decelerate or not power said motor.

According to one possible feature, said motor comprises a sensor for measuring the angular position of said rotor, and said means for controlling are configured to determine and record the angular position of said at least one anvil at the end of each impact cycle based on the measurement made using said sensor, and to deduce therefrom, at a subsequent impact cycle, the angular position of said at least one hammer relative to said at least one anvil and the reaching of said predetermined angular position.

According to one possible feature, a device according to the invention comprises an output shaft rigidly connected to said at least one anvil, said device comprising a sensor for measuring the angular position of said output shaft, said means for controlling being configured to determine and record the angular position of said output shaft at the end of each impact cycle and to deduce therefrom, at the subsequent impact cycle, the angular position of said at least one hammer relative to said at least one anvil and the reaching of said predetermined angular position.

According to one possible feature, said means for controlling are capable of controlling said motor so as to stabilize the angular offset between said rotor and said flywheel in said predetermined angular position of said at least one hammer.

According to one possible feature, a device according to the invention comprises an angle sensor capable of measuring the angular position of said flywheel, said means for controlling being capable of calculating the angular position of said rotor relative to said flywheel.

5. DESCRIPTION OF THE FIGURES

Further features and advantages of the invention will become apparent on reading the following description of specific embodiments, which is given merely as a non-limiting example for illustration purposes, and the accompanying drawings, in which:

FIG. 1 shows a longitudinal, sectional view of a device according to a first embodiment of the invention;

FIG. 2 shows an exploded, partial view of the device in FIG. 1;

FIG. 3 shows different cross-sections of the device in FIG. 1 with hammers in the non-engaged position;

FIG. 4 shows different cross-sections of the device in FIG. 1 with hammers in the engaged position;

FIG. 5 shows different cross-sections of the device in FIG. 1 with hammers in the engaged position;

FIG. 6 shows a relative position of the hammers and the anvils that does not allow the hammers to move into the engaged position;

FIG. 7(*a*) shows a relative position of the hammers and the anvils that allows the hammers to move into the engaged position, and FIG. 7(*b*) shows a relative position of the hammers and the anvils with the hammers in the engaged position;

FIG. 8 shows different relative positions of the hammers and the anvils of a device in operation;

FIG. 9 shows a longitudinal, sectional view of a device according to a second embodiment of the invention;

FIG. 10 shows an exploded, partial view of the device in FIG. 9;

FIG. 11 shows different cross-sections of the device in FIG. 9 with hammers in the engaged position and colliding with the anvils;

FIG. 12 shows different cross-sections of the device in FIG. 9 with hammers in the non-engaged position;

FIG. 13 shows different cross-sections of the device in FIG. 9 with hammers in the engaged position and not colliding with the anvils;

FIG. 14 shows a longitudinal, sectional view of a device according to a third embodiment of the invention;

FIG. 15 shows partial, perspective views of a striking mechanism of the device in FIG. 14 in different positions;

FIG. 16 shows an exploded, partial view of the device in FIG. 14;

FIG. 17(*b*) shows the guide pin bearing against the stop so as to place the hammers in the non-engaged position; FIG. 17(*a*) shows an ordinary relative position of the hammers in the non-engaged position and of the anvils;

FIG. 18 shows a sectional view of the device in FIG. 14;

FIG. 19(*b*) shows the guide pin not bearing against the stop so as to place the hammers in the engaged position; FIG. 19(*a*) shows the hammers in the engaged position colliding with the anvils;

FIG. 20(*a*) shows the guide pin bearing against the stop so as to place the hammers in the non-engaged position; FIG. 20(*a*) shows an ordinary relative position of the hammers in the non-engaged position and of the anvils;

FIG. 21 shows a fourth embodiment of a device according to the invention;

FIG. 22 shows the variation over time of the speed and acceleration of the motor of a device according to the invention in operation.

6. DESCRIPTION OF SPECIFIC EMBODIMENTS

6.1. First Embodiment

A first embodiment of a screwing/unscrewing device according to the invention, also referred to as an impact wrench, is shown with reference to FIGS. 1 to 8.

Such a device comprises a casing 1 housing an electric motor 2 comprising a stator 20 and a rotor 21. It comprises an actuating trigger 10.

The rotor 21 is provided with a drive shaft 3, at the end of which protrude two fins 4 extending away from one another along an axis perpendicular to the longitudinal axis of the drive shaft 3.

The end of the drive shaft 3 further comprises an indexing pin 5.

The device comprises an impact mechanism 6 comprising:

- at least one anvil 60 mounted such that it can rotate about the axis of rotation of the rotor 21;
- at least one hammer 61 capable of being rotated by the motor along said axis.

Each anvil 60 comprises two opposing collision surfaces 601.

The anvils 60 are rotatably linked to an output shaft 602, also referred to as an output square, which is capable of carrying a screwing/unscrewing bit in order to rotate an element to be screwed/unscrewed such as a nut or a screw.

Each hammer 61 comprises two opposing striking surfaces 610. Each hammer 61 further comprises two lugs 620 separated by a central recess 630 defining a ramp profile 640 against which the fins 4 of the drive shaft can move.

The hammers 61 are rigidly connected to a flywheel 7. The flywheel 7 forms a bell inside which the hammers 61 are placed. The hammers 61 are mounted such that they can rotate on shafts 70 fixed to the flywheel 7 such that they are stationary and which extend along axes parallel to the axis of rotation of the rotor.

The rotor, the drive shaft, the flywheel and the output shaft are coaxial.

A hole 71 passes through the center of the flywheel, at the periphery of which hole is formed a groove 72, of a larger outer diameter, which extends over an angular portion bounded by two stops 73. The implementation of two stops allows the device to operate both during screwing and unscrewing. The implementation of a single stop would allow the device to operate in only one or the other of these two directions.

The indexing pin 5 has a shape that complements that of the groove 72 so that it can move therein until it comes to bear against either of the stops 73 bounding the groove 72. The flywheel 7 is thus capable of rotating on the drive shaft 3 along the axis thereof over an angular range bounded by the two stops 73.

The flywheel is thus capable of rotating relative to the drive shaft over an angular range bounded by at least one end position, two end positions defined by the stops 73 in this embodiment, wherein the flywheel and the drive shaft are rotatably linked. When the indexing pin 5 is bearing against a stop 73, the flywheel 7 and the drive shaft 3 are rotatably linked in the direction for bringing the indexing pin closer to the stop.

Each hammer 61 is capable of rotating about the corresponding shaft 70 between at least:

- a non-engaged position in which it is not capable of colliding with the anvil 60 when the hammer is rotated by the motor, and
- an engaged position in which it is capable of colliding with the anvil 60 when the hammer is rotated by the motor.

The striking and collision surfaces are capable of hitting one another when the at least one hammer is in the engaged position thereof and when the at least one hammer is rotated by the motor.

The striking and collision surfaces are not capable of hitting one another when the at least one hammer is in the non-engaged position and when the at least one hammer is rotated by the motor.

The device comprising at least one actuating element acting on the at least one hammer in order to place it

- in the non-engaged position thereof when the drive shaft is in the at least one end position and
- in the engaged position thereof when the drive shaft is in a predetermined position in the angular range.

The actuating element comprises the fins 4 which are fixed to the drive shaft 3 for rotation therewith and which are capable of moving against the ramps 640 of the lugs 620 of the hammers 61.

The fins 4 and the ramps 640 are shaped

- so as to place the at least one hammer in the non-engaged position when the drive shaft is in the at least one end position and
- so as to place the at least one hammer in the engaged position when the drive shaft is in the predetermined position in the angular range.

When the indexing pin 5 is bearing against one of the stops 73, the fins 4 are housed inside the central recesses 630 in the hammers 61. The hammers are thus held in the non-engaged position thereof and the flywheel is rotatably linked to the drive shaft so that the motor can freely drive the hammers which rotate about the anvil without colliding therewith.

As the indexing pin 5 moves in the groove between the two stops 73, it takes a predetermined position wherein the fins 4 interact with the lugs 620 to bring the hammers into the engaged position and thus allow the striking surface thereof to collide with the collision surfaces of the anvils.

FIG. 3 (*c*) shows the indexing pin 5 bearing against a stop 73 of the flywheel. FIG. 3 (*b*) shows the corresponding non-engaged position of the hammers. FIG. 3 (*a*) shows an ordinary angular position of the hammers rotating about the anvils in the non-engaged position thereof.

FIG. 4 (*c*) shows the indexing pin 5 in a predetermined position between the stops 73 corresponding to the engaged position of the hammers. FIG. 4 (*b*) shows the corresponding engaged position of the hammers. FIG. 4 (*a*) shows an ordinary angular position of the hammers relative to the anvils before impact in the engaged position thereof.

FIG. 5 (*c*) shows the indexing pin 5 in a predetermined position between the stops 73 corresponding to the engaged position of the hammers. FIG. 5 (*b*) shows the corresponding engaged position of the hammers. FIG. 5 (*a*) shows a position of the hammers in the engaged position thereof colliding with the anvils.

The device comprises means for controlling the motor, which means are capable of transmitting a command instruction to the motor.

These means for controlling comprise a user interface, such as a screen and/or a keyboard allowing the user to input, for example, a setpoint for a tightening torque or for a percentage of a maximum tightening torque.

The means for controlling comprise a controller for converting the user's instruction into a speed according to a pre-set control law. They allow a method to be implemented for controlling the device in order to work towards carrying out a screwing or unscrewing operation comprising carrying out a series of successive impact cycles during each of which the hammers collide with the anvils.

The angle sensor of the motor allows the controller to know the position of the rotor in real time and to calculate the speed thereof.

When the operator actuates the trigger of the impact wrench to trigger a screwing or unscrewing operation, the means for controlling transmit an instruction to the motor to bring it to a predetermined rotation frequency Vi. The device is in an ordinary state such as, for example, that shown in FIG. 8 (*a*).

The drive shaft moves inside the groove of the flywheel until it comes to bear against the stop 73 (passage from FIG. 8(*a*) through 8(*b*) to 8(*c*)). The flywheel is thus rotatably linked to the drive shaft and the hammers are placed in the non-engaged position thereof by the fins; the anvils remain rotatably stationary (see FIG. 8(*d*)).

When the rotor reaches the rotation frequency Vi, the means for controlling control the motor so that they remain at the rotation frequency Vi until satisfaction of a condition checking that the impact mechanism is in a suitable position prior to impact. It can be clearly seen from FIGS. 6 and 7 that when the hammers are in the non-engaged position, they form a bell around the anvils. They can thus rotate about the anvils without interfering therewith. However, in order to move from the non-engaged position to the engaged position thereof, the hammers must be in a specific position relative to the anvils. More specifically, the relative position of the hammers and the anvils must be such as to allow the hammers to move into the engaged position thereof without friction against the outer peripheral surface of the anvils. In FIG. 6, the relative position of the hammers to the anvils does not allow the hammers to move from the non-engaged position to the engaged position thereof. Conversely, in FIG. 7, the relative position of the hammers to the anvils does allow the hammers to move from the non-engaged position thereof (see FIG. 7 (*a*)) to the engaged position thereof (see FIG. 7 (*b*)).

In order to achieve this and according to a first alternative, an angular position sensor can be placed on the output shaft to which the anvils are rigidly connected.

At the end of each impact, this sensor measures the angular position of the output shaft and thus that of the anvils, which remains unchanging until the subsequent impact. During the subsequent impact cycle, the position of the anvils is thus known (it corresponds to that measured at the end of the previous impact cycle), whereas that of the hammers is deduced from that of the rotor measured by the angle sensor of the motor. The relative position of the hammers to the anvils can thus be known, and the deceleration of the motor can be controlled so as to place the hammers in the engaged position thereof only when the angular position thereof relative to the anvils allows them to pass from the non-engaged position to the engaged position thereof without interfering with the anvils.

According to a second alternative, the angular position of the anvils can be determined without implementing an angle sensor on the output shaft. In such a case, the angular position of the anvils is determined using the angle sensor of the motor upon each impact. More specifically, when a sharp drop in the rotation frequency of the motor is detected, following the occurrence of an impact in the impact mechanism, the means for controlling record the position of the rotor which corresponds to that of the anvils. At the subsequent impact cycle, the relative position of the anvils, which position is that recorded during the previous cycle, and of the hammers, which corresponds to that measured in real time by the angle sensor of the motor, can thus be known. The relative position of the hammers to the anvils can thus be known, and the deceleration of the motor can be controlled so as to place the hammers in the engaged position thereof only when the angular position thereof relative to the anvils allows them to pass from the non-engaged position to the engaged position thereof without being hindered by the potential positioning of the hammers facing the anvils.

According to this alternative, at least one impact must take place before being able to deduce the initial position of the anvils. The screwing cycle will thus begin with a first impact at a low speed, for which the motor braking instruction will begin as soon as the desired speed is reached, without any other condition.

Once the relative position of the hammers to the anvils is such that it allows the hammers to move from the non-engaged position to the engaged position thereof, the motor can be controlled so as to place the hammers in the engaged position thereof.

For the hammers to be in the engaged position thereof, the angular offset between the drive shaft and the flywheel must be equal to a predetermined value α.

Once the relative position of the hammers to the anvils is suitable, the motor is thus decelerated by the means for controlling so that the angular offset between the flywheel and the drive shaft reaches the predetermined value α in which the hammers are in the engaged position thereof.

Just before the engine is decelerated, the drive shaft and the flywheel rotate at the speed Vi. When the engine is decelerated, the flywheel continues to rotate at the speed Vi due to its inertia. The angular position thereof can thus be known from its speed and the position it occupied just before the motor was braked, this position being that of the rotor measured by the angle sensor of the motor at the time when the motor was decelerated. Alternatively, the angular position of the flywheel can be known by using an angle sensor placed on the flywheel. The position of the drive shaft, which corresponds to that of the rotor, can also be known in real time. By taking these data into consideration, the time at which the offset between the flywheel and the drive shaft reaches the predetermined value α in which the hammers are in the engaged position thereof (see FIG. 8(*e*)) can thus be detected.

When this time is detected, the means for controlling re-accelerate the motor to the speed Vi such that the angular offset between the drive shaft and the flywheel is maintained at the predetermined value α in which the hammers are in the engaged position thereof.

The speed Vi is maintained until the means for controlling detect a rapid drop in the speed of the motor following the time at which the hammers collide with the anvils to rotate the output shaft and thus the element to be screwed.

The position of the output shaft is measured at the end of the impact and then a new impact cycle is carried out. The impact cycles are repeated in series until the desired tightening torque is reached.

FIG. 22 shows the variation over time of the speed and acceleration of the motor during impact cycles.

A screwing operation typically comprises two successive phases:

- an approach phase during which the screw is not in contact with the element to be tightened. The screw typically has a long distance to travel, during which it emits almost no resistance, before reaching the element to be tightened. The speed of rotation of the screw must thus be relatively high.
- a tightening phase during which the screw is in contact with the element to be tightened. The torque required to rotate the screw increases significantly.

The approach phase is carried out by producing a multitude of small impacts.

6.2. Second Embodiment

A second embodiment of an impact wrench according to the invention is shown with reference to FIGS. 9 to 13.

Only the differences between the first embodiment and the second embodiment are described hereinbelow.

In this second embodiment, the device comprises at least one driven gear 8 which is fixed to each of the hammers 61 for rotation therewith.

The actuating element in this case comprises a drive gear 9 fixed to the drive shaft 3 for rotation therewith and engaged with the driven gear of each hammer 61.

A relative motion of the drive shaft 3 to the flywheel 7 allows the at least one hammer to be moved between the engaged and non-engaged positions thereof.

FIG. 12 (*c*) shows the indexing pin 5 bearing against a stop 73 of the flywheel. FIG. 12 (*a*) shows the corresponding non-engaged position of the hammers. FIG. 12 (*b*) shows the meshing of the gears.

FIG. 13 (*c*) shows the indexing pin 5 in a predetermined position between the stops 73 corresponding to the engaged position of the hammers. FIG. 13 (*a*) shows the corresponding engaged position of the hammers and an ordinary position of the hammers relative to the anvils before impact. FIG. 13 (*b*) shows the meshing of the gears.

FIG. 11 (*c*) shows the indexing pin 5 in a predetermined position between the stops 73 corresponding to the engaged position of the hammers. FIG. 11 (*a*) shows the corresponding engaged position of the hammers and a position of the hammers colliding with the anvils. FIG. 11 (*b*) shows the meshing of the gears.

The means for controlling and the way of controlling the motor are the same as for the first embodiment.

6.3. Third Embodiment

A third embodiment of an impact wrench according to the invention is shown with reference to FIGS. 14 to 20. Only the main differences between the third embodiment and the previous two embodiments are described hereinbelow.

In this third embodiment, said at least one hammer is capable of translating, between the engaged and non-engaged positions thereof, along an axis parallel to the axis of rotation of said drive shaft.

In this embodiment, the device comprises a secondary drive shaft 9 which is fixed to the drive shaft 3 of the rotor 21 for rotation therewith but free to translate.

The secondary drive shaft 9 is mounted such that it can translate and rotate relative to the flywheel 7 along the axis of rotation of the drive shaft 3.

The secondary drive shaft 9 comprises at least one cam 90 against which at least one guide pin 91 extending perpendicular to the axis of rotation of the flywheel, and rigidly connected to the flywheel 7, is capable of moving.

The cam 9 is bounded by two stops 73 bounding an angular range in which the flywheel is free to rotate relative to the secondary drive shaft between two end positions.

The at least one cam 90 has a profile that is shaped to allow the secondary drive shaft 9 to move rotationally relative to the flywheel over said angular range between the end positions and a predetermined position in the angular range, and to allow for a translational motion of the secondary drive shaft relative to the flywheel during the movement thereof from either one of the end positions and the predetermined position.

The hammers 61 are shafts that are mounted such that they can translate inside guide ramps 700 of the flywheel along axes parallel to the axis of rotation thereof. Each hammer has a groove 650 inside which an edge of a washer 100 fastened to the end of the secondary drive shaft 9 is housed so as to translationally link the hammers with the secondary drive shaft so as to move them between the engaged and non-engaged positions thereof.

Resilient return means, such as compression springs 11, act on the hammers to bias them to return to the non-engaged position thereof.

FIGS. 15(*a*) and 15(*b*) show the hammers in the non-engaged position. FIG. 15(*c*) shows the hammers in the engaged position.

FIG. 17 (*b*) shows the guide pin 91 bearing against the stop 73 to place the hammers in the non-engaged position. FIG. 17(*a*) shows an ordinary relative position of the hammers in the non-engaged position to the anvils.

FIG. 20 (*a*) shows the guide pin 91 bearing against the stop 73 to place the hammers in the non-engaged position. FIG. 20(*a*) shows an ordinary relative position of the hammers in the non-engaged position to the anvils.

FIG. 19 (*b*) shows the guide pin 91 not bearing against the stop 73 to place the hammers in the engaged position. FIG. 19 (*a*) shows the hammers in the engaged position colliding with the anvils.

The means for controlling and the way of controlling the motor are the same as for the first embodiment.

6.4. Fourth Embodiment

A fourth embodiment is shown with reference to FIG. 21.

In this embodiment, the motor comprises an internal stator 20 provided with coils 200, the rotor 21 being external.

The external rotor forms a flywheel.

The hammers are fixed to the rotor for rotation therewith, and are mounted such that they can rotate relative to the rotor along axes parallel to the axis of rotation thereof between the engaged and non-engaged positions thereof.

In the engaged position thereof, the striking surfaces 610 of the hammers 61 protrude from the periphery of the rotor to collide with the anvils.

In the non-engaged position thereof, the striking surfaces 610 of the hammers 61 do not protrude from the periphery of the rotor so as not to collide with the anvils.

In this embodiment, the magnetic fields created by the coils act on the hammers:

- to place them in the non-engaged position thereof when the means for controlling power the coils in order to rotate the rotor,
- to place them in the engaged position thereof when the means for controlling do not power the coils in order to rotate said rotor.

The means for controlling are thus able to transmit to the motor:

- a rotation instruction to place the hammers in the non-engaged position thereof and rotate the rotor, and
- a motor stop instruction to place the hammers in the engaged position thereof and trigger an impact of the hammers against the anvils.

Resilient return means, such as compression springs, and/or centrifugal force, allow the hammers to be moved into the engaged position thereof when the power to the coils is cut off.

In FIG. 21(*a*), the hammers are in the non-engaged position. In FIG. 21(*b*), the hammers are in the engaged position.

One or more exemplary embodiments of the invention aim to provide an effective solution to at least some of the various problems of the prior art.

In particular, an exemplary embodiment provides an electric impact wrench that allows a high tightening torque to be quickly reached.

An exemplary embodiment provides such an impact wrench with a simple design.

An exemplary embodiment provides such an impact wrench that is both reliable and robust.

An exemplary embodiment provides such an impact wrench that is cost-effective.

Although the present disclosure has been described with reference to one or more examples, workers skilled in the art will recognize that changes may be made in form and detail without departing from the scope of the disclosure and/or the appended claims.

The invention claimed is:

1. An impact screwing/unscrewing device comprising:
- an electric motor comprising a rotor having an axis of rotation;
- a controller, wherein the controller is configured to transmit a command instruction to said motor; and
- an impact mechanism comprising:
  - at least one anvil mounted such that the at least one anvil can rotate about the axis of rotation of said rotor;
  - at least one hammer which is rotatable by said motor about said axis of rotation, said at least one hammer being movable between at least:
    - a non-engaged position in which the at least one hammer is not capable of colliding with said at least one anvil when the at least one hammer is rotated by said motor, and
    - an engaged position in which the at least one hammer is capable of colliding with said at least one anvil when the at least one hammer is rotated by said motor, wherein a variation of said command instruction supplied to said motor by said controller triggers passage of said at least one hammer from one of the non-engaged position and the engaged position to the other;

wherein said controller is configured to control said motor to carry out a screwing or unscrewing operation comprising a series of successive impact cycles during each of which the at least one hammer collides with the at least one anvil, said controller being configured to generate, during each impact cycle, a variation of said command instruction supplied to said motor, said variation triggering passage of said at least one hammer from one of the non-engaged position and the engaged position to the other.

2. The impact screwing/unscrewing device according to claim 1 wherein said device comprises a flywheel coaxial to said rotor.

3. The impact screwing/unscrewing device according to claim 1 wherein:

said at least one hammer comprises at least one striking surface and said at least one anvil comprises at least one collision surface, said at least one striking surface and said at least one collision surface are arranged to hit one another when said at least one hammer is in said engaged position and when said at least one hammer is rotated by said motor, and said at least one striking surface and said at least one collision surface are arranged not to hit one another when said at least one hammer is in said non-engaged position and when said at least one hammer is rotated by said motor.

4. The impact screwing/unscrewing device according to claim 2 wherein:

said rotor is provided with a drive shaft, said flywheel is coaxial with said drive shaft, said at least one hammer is attached to said flywheel such that said at least one hammer can move between the non-engaged and engaged positions thereof, said flywheel is arranged to rotate relative to said drive shaft over an angular range bounded by at least one end position in which said flywheel and said drive shaft are rotatably linked and said at least one hammer is in the non-engaged position thereof, and said device comprises at least one actuating element actable on said at least one hammer in order to place the at least one hammer:

in the non-engaged position thereof when said drive shaft is in said at least one end position; and in the engaged position thereof when said drive shaft is in a predetermined position in said angular range.

5. The impact screwing/unscrewing device according to claim 4 wherein said at least one end position comprises two end positions, said flywheel and said drive shaft being rotatably linked in said two end positions and said at least one hammer being in the non-engaged position thereof when said flywheel and said drive shaft are in said two end positions.

6. The impact screwing/unscrewing device according to claim 5 wherein said at least one hammer is rotatable between the engaged and non-engaged positions thereof, along an axis parallel to the axis of rotation of said rotor.

7. The impact screwing/unscrewing device according to claim 6 comprising an indexing pin fixed to said drive shaft for rotation therewith and capable of bearing, in said at least one end position, against at least one stop, that is fixed to said flywheel for rotation therewith, so as to rotatably link said drive shaft and said flywheel.

8. The impact screwing/unscrewing device according to claim 7 wherein:

said at least one actuating element comprises at least one fin that is fixed to said drive shaft for rotation therewith and capable of moving along at least one ramp rigidly connected to said at least one hammer, and said at least one fin and said at least one ramp are shaped:

to place said at least one hammer in said non-engaged position when said drive shaft is in said at least one end position; and to place said at least one hammer in said engaged position when said drive shaft is in said predetermined position in said angular range.

9. The impact screwing/unscrewing device according to claim 7 wherein:

said device comprises at least one driven gear fixed to each of said at least one hammer for rotation therewith, the at least one hammer being rigidly connected to said flywheel, said at least one actuating element comprises a drive gear fixed to said drive shaft for rotation therewith and engaged with the at least one driven gear, and a relative motion of said drive shaft relative to said flywheel allows said at least one hammer to be moved between the engaged position and the non-engaged position thereof.

10. The impact screwing/unscrewing device according to claim 5 wherein said at least one hammer is capable of translating, between the engaged position and non-engaged position thereof, along an axis parallel to an axis of rotation of said drive shaft.

11. The impact screwing/unscrewing device according to claim 10 comprising a secondary drive shaft fixed to said drive shaft for rotation therewith but free to translate, said secondary drive shaft being mounted such that the secondary drive shaft can translate and rotate relative to said flywheel along the axis of rotation of said drive shaft, said secondary drive shaft comprising at least one cam against which at least one guide pin rigidly connected to said flywheel is capable of moving, said at least one cam having a profile that is shaped to allow said secondary drive shaft to rotate relative to said flywheel over said angular range between said at least one end position and said predetermined position, and to allow for a translational movement of said secondary drive shaft relative to said flywheel during movement of the secondary drive shaft between said at least one end position and said predetermined position.

12. The impact screwing/unscrewing device according to claim 11 wherein said at least one hammer is fixed to said drive shaft for translation therewith but not for rotation therewith, and is mounted such that the at least one hammer can translate relative to said flywheel so as to be moved between the engaged and non-engaged positions thereof by said drive shaft.

13. The impact screwing/unscrewing device according to claim 2 wherein said motor comprises an internal stator provided with coils, said rotor being external to said stator and forming said flywheel, said at least one hammer being fixed to said rotor for rotation therewith and being mounted such that the at least one hammer can rotate relative to said rotor between the engaged and non-engaged positions thereof along an axis parallel to the axis of rotation of said rotor, wherein magnetic fields created by said coils act on said at least one hammer:

to place said at least one hammer in the non-engaged position thereof when said controller powers said coils in order to rotate said rotor, and to place said at least one hammer in the engaged position thereof when said controller does not power said coils in order to rotate said rotor.

14. The impact screwing/unscrewing device according to claim 4 wherein said controller is configured to:

supply an instruction to accelerate said motor in a direction to place said drive shaft in one of the at least one end position thereof and rotate said flywheel in a direction up to a predetermined speed;

supply a deceleration instruction to said motor such that said drive shaft moves relative to said flywheel over said angular range to reach said predetermined position and place said at least one hammer in the engaged position thereof to cause said at least one hammer to collide with said at least one anvil, and supply an instruction to re-accelerate said motor in said direction.

15. The impact screwing/unscrewing device according to claim 13 wherein said controller is configured to:

supply an instruction to power said motor in order to rotate said rotor in a direction and place said at least one hammer in said non-engaged position; and supply an instruction to not power said motor in order to place said at least one hammer in said engaged position and allow said rotor to rotate in said direction to cause said at least one hammer to collide with said at least one anvil.

16. The impact screwing/unscrewing device according to claim 14 wherein said controller is configured to maintain rotation of said rotor at said predetermined speed until the controller detects at least one parameter signifying that said at least one hammer is in a predetermined angular position along the axis of rotation of said rotor relative to said at least one anvil, before supplying said deceleration instruction to said motor.

17. The impact screwing/unscrewing device according to claim 16 wherein said motor comprises a sensor for measuring an angular position of said rotor, and said controller is configured to determine and record an angular position of said at least one anvil at an end of each impact cycle based on a measurement made using said sensor, and to deduce therefrom, at a subsequent impact cycle, an angular position of said at least one hammer relative to said at least one anvil and a reaching of said predetermined angular position.

18. The impact screwing/unscrewing device according to claim 16 comprising an output shaft rigidly connected to said at least one anvil, said device comprising a sensor for measuring an angular position of said output shaft, said controller being configured to determine and record the angular position of said output shaft at an end of each impact cycle and to deduce therefrom, at a subsequent impact cycle, an angular position of said at least one hammer relative to said at least one anvil and a reaching of said predetermined angular position.

19. The impact screwing/unscrewing device according to claim 16 wherein said controller is configured to control said motor so as to stabilize an angular offset between said rotor and said flywheel in said predetermined angular position of said at least one hammer.

20. The impact screwing/unscrewing device according to claim 19 comprising an angle sensor capable of measuring an angular position of said flywheel, said controller being configured to calculate an angular position of said rotor relative to said flywheel.

21. An impact screwing/unscrewing device comprising:

an electric motor comprising a rotor having an axis of rotation and a drive shaft;

a flywheel coaxial to the drive shaft of said rotor;

a controller, wherein the controller is configured to transmit a command instruction to said motor; and an impact mechanism comprising:

at least one anvil mounted such that the at least one anvil can rotate about the axis of rotation of said rotor;

at least one hammer which is rotatable by said motor about said axis of rotation, said at least one hammer being movable between at least:

a non-engaged position in which the at least one hammer is not capable of colliding with said at least one anvil when the at least one hammer is rotated by said motor, and an engaged position in which the at least one hammer is capable of colliding with said at least one anvil when the at least one hammer is rotated by said motor, wherein a variation of said command instruction supplied to said motor by said controller triggers passage of said at least one hammer from one of the non-engaged position and the engaged position to the other; and wherein:

said at least one hammer is attached to said flywheel such that said at least one hammer can move between the non-engaged and engaged positions thereof, said flywheel is arranged to rotate relative to said drive shaft over an angular range bounded by at least one end position in which said flywheel and said drive shaft are rotatably linked and said at least one hammer is in the non-engaged position thereof, and said device comprises at least one actuating element actable on said at least one hammer in order to place the at least one hammer:

in the non-engaged position thereof when said drive shaft is in said at least one end position; and in the engaged position thereof when said drive shaft is in a predetermined position in said angular range.

* * * * *